UNITED STATES PATENT OFFICE.

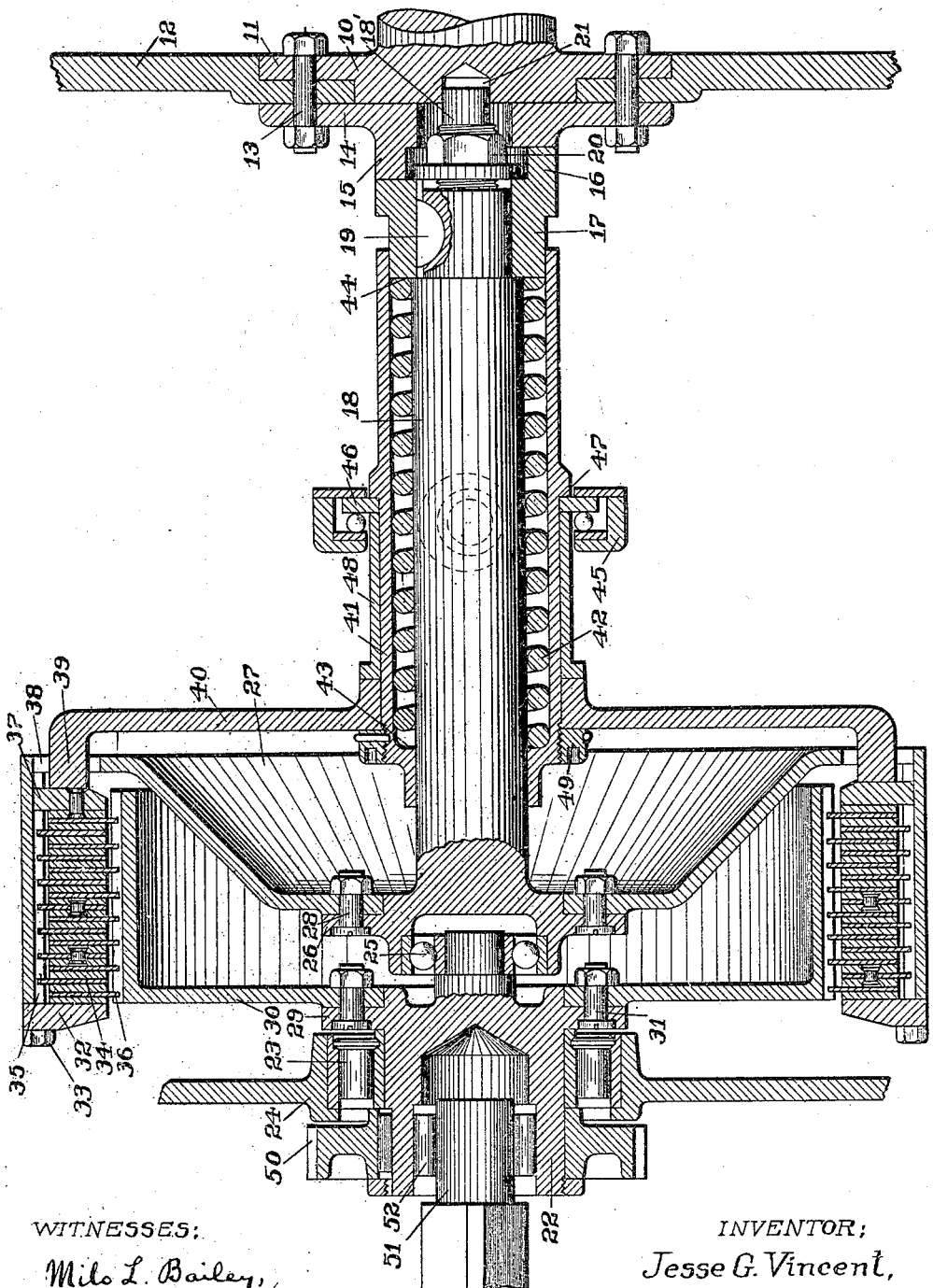

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

CLUTCH MECHANISM.

1,293,995.          Specification of Letters Patent.      Patented Feb. 11, 1919.

Application filed April 14, 1913. Serial No. 761,096.

*To all whom it may concern:*

Be it known that I, JESSE G. VINCENT, a citizen of the United States, and resident of Detroit, Wayne county, State of Michigan, have invented certain new and useful Improvements in Clutch Mechanism, of which the following is a specification.

This invention relates to motor vehicles, and particularly to the construction of the crank shaft, the clutch, the gears and the connections between these elements.

In motor vehicle construction, it is desirable to reduce as much as possible the weight of the driven parts of the clutch and the connections from those parts to the change speed gearing. One of the objects of the present invention is to produce a clutch in which the driven elements are light in weight.

Another object of the invention is to produce a clutch and its connected parts of simple and improved form and construction.

Other objects of the invention will be observed from the following description, taken in connection with the drawing which forms a part of this specification, and in which is shown a longitudinal sectional view through a clutch and connected parts, embodying this invention.

In the drawing, 10 represents the motor crank shaft, upon the flange 11 of which is secured the fly wheel 12 as by bolts 13. Also secured to the flange 11 by these bolts is a connecting piece 14, which is formed with jaws 15, coöperating with similar jaws 16, on a sleeve 17. The sleeve 17 is keyed and secured upon the forward end of a shaft 18, by the key 19 and nut 20, which thereby in effect constitutes said shaft a detachable extension of the crank shaft 10. The forward cylindrical end 18' of the shaft 18 is also extended into an opening 21, formed centrally in the rearward end of the crank shaft 10, thus centering the shaft 18 relative to the crank shaft.

The shaft 18 may be called the clutch driving shaft, and the driven shaft of the clutch is shown at 22 and may be called the clutch shaft. It is mounted in a bearing 23 in a support 24. A bearing 25 in the rearward end of the shaft 18 forms a relatively rotatable connection between the extension 18 and the clutch shaft 22. Thus the shaft 22 is axially alined with the shaft or extension 18 and the crank shaft 10.

The rear end of the shaft 18 is formed with a flange 26, upon which is secured the clutch driving drum 27, as by the bolts 28. Also the clutch driven shaft 22 is formed with a flange 29, upon which is secured the clutch driven drum 30, as by the bolts 31. A backing plate 32 is secured upon the rearward end of the drum 27 by the securing nuts 33, and a series of driving plates 34 are arranged to slide upon keys 35, arranged longitudinally of the driving drum 27. Similar plates 36 are keyed upon the driven drum 30 and arranged alternately with the plates 34, all of the plates being pressed together in frictional contact by the foremost master plate 37.

The web of the driving drum 27 is formed near its periphery with a series of openings 38, through which the fingers 39 of a spider 40 may pass to operate the plates within the clutch drum. The spider 40 is thereby caused to turn with the driving drum and it is secured upon a cylindrical part of a sleeve 41, which is arranged to slide upon the shaft 18 and inclose the clutch spring 42, which is adapted to be compressed by said sleeve between its shoulder 43 and a shoulder 44 formed by the sleeve 17 on the forward end of the shaft 18. A shifter ring 45 is arranged to shift the sleeve 41 by means of a thrust bearing 46, one of the disks of which is secured between a shoulder 47, formed integrally with the sleeve 41, and a ring 48 extending forwardly from the thrust bearing to the rear end of the hub of the spider 40. All of these parts are then firmly secured upon the sleeve 41 by means of a nut 49.

Any suitable means, not shown, may be provided for shifting the shifter ring 45 to compress the spring 42 and thereby release the clutch.

The rear end of the shaft 22 may be connected with any suitable driving connection between it and the change speed gearing of the vehicle, and, in the drawing, the rear end of said shaft is shown as having one of the gears 50 keyed directly thereto, and one of the driven shafts of the change speed gearing is indicated at 51 as mounted directly in a bearing 52 in the rear end of said shaft 22.

It will be seen, therefore, that the driven parts of the clutch are very light in weight, all of the heavy parts being mounted upon the extension 18 of the crank shaft 10, and that, therefore, when the clutch is released, the driven parts thereof will have very little inertia and will quickly stop spinning, so that the gears may be quietly shifted.

A specific embodiment of the invention has been described in detail, and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:

1. In a motor vehicle, in combination, a motor crank shaft having a flywheel at one end, a shaft detachably secured to the crank shaft and forming an alined extension beyond the flywheel, a driven shaft mounted in supporting bearings in line with the crank shaft, a relatively rotatable connection between the free end of said extension and the adjacent end of said driven shaft, a clutch part on said extension, a clutch part on said driven shaft, clutch members for said parts for forming a driving connection from one part to the other, and a spring on said extension for operating the clutch.

2. In a motor vehicle, in combination, a drive shaft and a driven shaft axially alined, flanges on the adjacent ends of said shafts, clutch driving and driven drums detachably mounted on the flanges of said respective driving and driven shafts, clutch plates between said drums, a sleeve slidable on the driving shaft, a spider on said sleeve and actuating said clutch plates, a spring around said driving shaft under said sleeve acting to force said spider to normally press said clutch plates into frictional engagement.

3. In a motor vehicle, in combination, a drive shaft and a driven shaft axially alined, flanges on the adjacent ends of said shafts, clutch driving and driven drums detachably mounted on the flanges of said respective driving and driven shafts, clutch plates between said drums, a sleeve slidable on the driving shaft, a shoulder on the rearward end of the sleeve bearing on the driving shaft, a spider on said sleeve and actuating said clutch plates, a spring around said driving shaft under said sleeve acting on said shoulder to move said sleeve relatively to said shaft and to force said spider to normally press said clutch plates into frictional engagement.

In testimony whereof I affix my signature in the presence of two witnesses.

JESSE G. VINCENT.

Witnesses:
O. E. HUNT,
LE ROI J. WILLIAMS.

Copies of this patent may be obtained for five cents each, by addressing the "Commissioner of Patents, Washington, D. C."